United States Patent
Martin

(10) Patent No.: US 10,122,651 B2
(45) Date of Patent: Nov. 6, 2018

(54) DYNAMIC BANDWIDTH CONTROL

(71) Applicant: INSPEED NETWORKS, INC., Los Altos, CA (US)

(72) Inventor: Kevin Martin, Menlo Park, CA (US)

(73) Assignee: INSPEED NETWORKS, INC., Los Altos, CA (US)

( * ) Notice: Subject to any disclaimer, the term of this patent is extended or adjusted under 35 U.S.C. 154(b) by 97 days.

(21) Appl. No.: 15/253,186

(22) Filed: Aug. 31, 2016

(65) Prior Publication Data
US 2018/0063019 A1 Mar. 1, 2018

(51) Int. Cl.
| H04L 12/28 | (2006.01) |
| H04L 12/911 | (2013.01) |
| H04L 12/26 | (2006.01) |
| H04L 12/927 | (2013.01) |

(52) U.S. Cl.
CPC ............ *H04L 47/781* (2013.01); *H04L 43/08* (2013.01); *H04L 43/0852* (2013.01); *H04L 47/805* (2013.01)

(58) Field of Classification Search
CPC ... H04L 12/5602; H04L 43/08; H04L 43/085; H04L 43/0852; H04L 47/10; H04L 47/15; H04L 47/22; H04L 47/2441; H04L 47/27; H04L 47/30; H04L 4/32; H04L 47/35; H04L 47/50; H04L 47/70; H04L 47/781; H04L 2012/5631; H04L 2012/5632; H04L 2012/5635; H04L 2012/5636; H04L 2012/568
See application file for complete search history.

(56) References Cited

U.S. PATENT DOCUMENTS

| 7,376,125 B1 | 5/2008 | Hussain et al. |
| 8,155,158 B2 | 4/2012 | Saavedra |
| 8,209,415 B2 | 6/2012 | Wei |
| 8,660,129 B1 | 2/2014 | Brendel et al. |
| 8,737,214 B2 | 5/2014 | Saavedra |
| 8,913,486 B2 | 12/2014 | Saavedra |
| 8,995,252 B2 | 3/2015 | Datta |

(Continued)

OTHER PUBLICATIONS

International PCT Application No. PCT/US017/046919; Filed: Aug. 15, 2017; Title: Dynamic Bandwidth Control; International Search Report and Written Opinion; Authorized Officer: Seong Woo Kim, Date of Completion: Nov. 15, 2017; 15 pgs.

(Continued)

*Primary Examiner* — Frank Duong
(74) *Attorney, Agent, or Firm* — Tarolli, Sundheim, Covell & Tummino LLP

(57) ABSTRACT

One or more non-transitory media instructions, which are executable by one or more processors. The instructions may include a bandwidth controller that includes a quality analyzer to provide a quality measurement for a given outgoing network connection from one network node to another of network node. The bandwidth controller provides a bandwidth control command that is dynamically adjusted over time based on the quality measurement and at least one of throughput or demand for bandwidth of the given outgoing network connection. The instructions may also include a rate limiter to adjust a rate limit for the given outgoing network connection based on the bandwidth control command.

29 Claims, 6 Drawing Sheets

(56) References Cited

U.S. PATENT DOCUMENTS

| | | | |
|---|---|---|---|
| 9,264,307 B2 | 2/2016 | Saavedra | |
| 9,264,350 B2 | 2/2016 | Saavedra | |
| 9,426,029 B2 | 8/2016 | Saavedra | |
| 9,692,713 B2 | 6/2017 | Saavedra | |
| 2002/0191250 A1 | 12/2002 | Graves et al. | |
| 2003/0163593 A1 | 8/2003 | Knightly | |
| 2003/0198184 A1 | 10/2003 | Huang et al. | |
| 2004/0073640 A1 | 4/2004 | Martin et al. | |
| 2008/0052394 A1* | 2/2008 | Bugenhagen | H04L 12/14 709/224 |
| 2010/0226250 A1 | 9/2010 | Plamondon | |
| 2010/0251329 A1 | 9/2010 | Wei | |
| 2012/0218887 A1* | 8/2012 | Khilnani | H04L 43/0876 370/230 |
| 2013/0275578 A1 | 10/2013 | Williams et al. | |
| 2014/0075048 A1 | 3/2014 | Yuksel et al. | |
| 2014/0181267 A1 | 6/2014 | Wadkins et al. | |
| 2015/0016249 A1 | 1/2015 | Mukundan et al. | |
| 2015/0236965 A1 | 8/2015 | Short et al. | |

OTHER PUBLICATIONS

Publication, Technology—Bigleaf Networks, "Architecture"; data:text/html;charset=utf-8%Ch3%20style%3D%22margin%3A%200px%3B%20padding%200px%eB20border%3A%200px%B%20font-weight%3A, Oct. 15, 2015; 5 pgs.

Publication, "PF: Packet Queueing and Prioritization", OpenBSD; http://www.openbsd.org/faq/pf/queueing.html; Oct. 11, 2015; 13 pgs.

Cisco Systems Handbook, "Quality_of_Service_Networking"; Oct. 16, 2012; 31 pgs.

Publication, "Acceleration Systems Technical Overview" ; Acceleration Systems; Sep. 2014, v1.4; 7pgs.

Frank Dürr, "technical Report Apr. 2012, Towards Cloud-assisted Software-defined Networking"; Institute of Parallel and Distributed Systems; Aug. 2012; 19 pgs.

Justine Sherry, et al., "Making Middleboxes Someone Else's Problem: Network Processing as a Cloud Service"; SIGCOMM'12; Aug. 13-17, 2012; 12 pgs.

Hasan T. Karaoglu, et al.; "Offloading Routing Complexity to the Cloud(s)"; IEE International Conference on Communications 2013: IEEE ICC'13—Workshop on Cloud Convergence: challenges for future infrastructures and services (WCC 201); Jun. 9-13, 2013; 5 pgs.

Hubert, Bert, "Linux Advanced Routing & Traffic Control HOWTO"; 2012, www.lartc.org/lartc.html.

Stearns, William, "Load balancing howlo"; 2002, (www.stearns.org/tunnel/load-balancing-howto).

\* cited by examiner

DYNAMIC BANDWIDTH CONTROL

TECHNICAL FIELD

This disclosure relates generally to dynamic bandwidth control.

BACKGROUND

Network traffic has become increasingly important as applications migrate to cloud-based services. Users seek high throughput and Internet Service Providers (ISPs) typically sell service based on download and upload speeds. Poor quality can occur when congestion arises at bottlenecks, such as where traffic transitions from higher-speed to lower-speed networks. Network buffers are commonly used to buffer packets waiting at such bottlenecks, but buffers can introduce delays that increase latencies and jitter. When buffers fill to capacity, subsequent arriving packets may be dropped and cause packet loss. The term "buffer bloat" is sometimes used to refer to these problems that arise from excessive buffering of packets.

Traffic shaping methods to limit the rate of traffic before it reaches these buffers have become commonly available, but such existing methods require identifying and configuring a bandwidth limit to the rate of traffic. If the limit is set too high, buffer bloat and poor quality may result. If the limit is set too low, throughput may be too low.

SUMMARY

This disclosure relates generally to dynamic bandwidth control As one example, one or more non-transitory media store machine readable instructions, which are executable by one or more processors. The instructions include a bandwidth controller that includes a quality analyzer to provide a quality measurement for a given outgoing network connection from one network node to another of network node. The bandwidth controller provides a bandwidth control command that is dynamically adjusted over time based on the quality measurement and at least one of throughput or demand for bandwidth of the given outgoing network connection. The instructions also include a rate limiter to adjust a rate limit for the given outgoing network connection based on the bandwidth control command.

As another example, an apparatus includes a network interface associated with a node (node A) to communicate bi-directional data traffic via a network connection between the apparatus another network interface associated with another node (node B). One or more non-transitory media store data, the data including machine readable instructions. One or more processors access the one or more media and execute the instructions to perform a method, the method including determining a quality condition associated with a given outgoing network connection from node A to node B based on quality measurements associated with the network connection. The method also includes generating a bandwidth control command that is dynamically adjusted over time based on the quality condition and at least one of throughput or demand for bandwidth of the given outgoing network connection. The method also includes adjusting a rate limit of the network interface for the given outgoing network connection based on the bandwidth control command.

DETAILED DESCRIPTION

Figure 1:
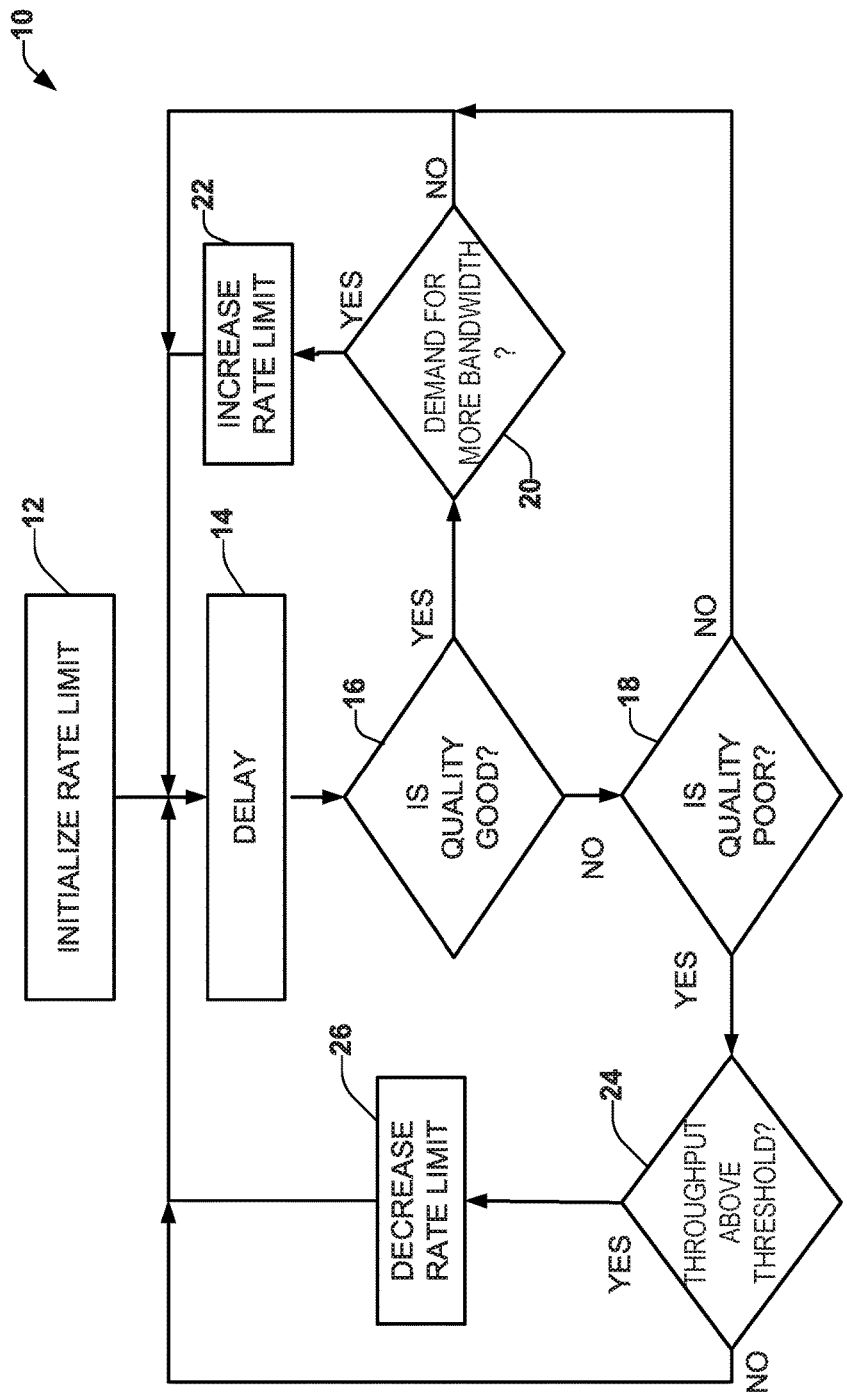
FIG. 1 is a flow diagram illustrating an example of a method for dynamically controlling bandwidth for a network connection.

This disclosure relates to systems and methods that implement dynamic bandwidth control for a network connection. The systems and methods monitor quality of the network connection and adjust bandwidth of such connection based on the quality and based on one or more of throughput or demand for bandwidth on the network connection.

As an example, a bandwidth controller implements a state machine to monitor the quality of a given connection. The bandwidth controller provides a bandwidth control command to a rate limiter for dynamically adjusting bandwidth sent from a network interface (e.g., a rate-limited interface) to achieve a desired balance between quality, throughput and demand for bandwidth. In some examples, the quality is measured passively without requiring that data traffic be injected into the given network connection. For instance, a ping or similar control command request (e.g., a single packet) can be sent via the given connection to determine timing information corresponding to a quality measurement for the given connection. As one example, the timing information can be computed as a latency value for a data packet to travel from one network node to another and, in some examples, as round trip latency including travel time back to the originating node that sent the packet via the given network connection. Additionally, or alternatively, other timing information associated with travel of a data packet (e.g., jitter) can be used to provide the quality measurement. Other quality measurements further may be used, such as packet loss or other metrics that affect user satisfaction or feedback from users associated with throughput and/or quality.

As a further example, when buffer bloat occurs at bottlenecks for traffic flowing from one node to another node, quality may degrade and such degradation is detected by the dynamic bandwidth controller. The bandwidth controller reduces bandwidth by providing the bandwidth control command to set a new lower rate limit. The lower rate reduces the flow of traffic, which mitigates buffer bloat and thereby improves quality. In contrast, when the dynamic bandwidth controller detects an increase in demand for bandwidth while the quality measurement indicates acceptable quality, the bandwidth controller increases bandwidth by providing the bandwidth control command to set a new higher rate limit.

The quality measurement for the given connection can be computed at a measurement interval (e.g., one or more seconds) to further mitigate impact on the rate of data traffic. The bandwidth controller utilizes the measurement interval (e.g., fixed or variable period of time) to establish a cadence for continuously evaluating quality measurement and other inputs (e.g., quality, throughput, demand) and, in turn, providing the bandwidth control command to the rate limiter. The dynamic bandwidth controller thus adjusts bandwidth, as needed, to achieve a balance between throughput and quality that seeks to optimize user satisfaction. The balance may change over time depending on the types and combinations of traffic that is sent via the given network connection as well as other traffic present in the network that may affect throughput and quality for the given network connection.

Thus, in contrast to conventional traffic shaping methods, which set a fixed bandwidth limit according to the expected capacity of a connection, the approach disclosed herein implements controls to dynamically and automatically adjust a rate limit for a given connection based on one or more discreet factors to improve user experience. Advantageously, the systems and methods herein do not require injection of traffic into the connection that is being dynamically controlled. That is, the approach disclosed herein can improve the user experience by implementing adjustments based on non-intrusive quality measurements that have been determined to correlate to user satisfaction. For example, certain timing information, such as latency and jitter, can thus provide non-intrusive quality measurements to drive dynamic bandwidth control over time.

Turning to the figures, FIG. 1 is a flow diagram depicting an example of a method 10 for dynamically controlling bandwidth of a given network connection between a pair of network nodes. For example, the method 10 can be performed by a bandwidth controller, such as implemented as a state machine (e.g., a user or OS kernel-level process), to dynamically control setting the rate limit for the outgoing data traffic over a network connection between a pair of nodes A and B. An instance of the method 10 can be implemented node A to control bandwidth of outgoing traffic from such node to node B. In other examples, an instance of the method 10 can be implemented at each of the pair of network nodes A and B that communicate via the given network connection to provide for bi-directional dynamic bandwidth control (e.g., traffic flowing from node A to B as well as from B to A). Additionally, in some examples, there can be more than one network connection between nodes A and B, and a separate instance of dynamic bandwidth control method 10 can be implemented for each rate-limited network interface. For example, an instance of the method 10 thus can be implemented to provide for dynamic bandwidth control of data traffic flowing through each of the respective different connections between nodes A and B, uni-directionally or bi-directionally.

At 12, a rate limit is initialized for outgoing traffic from one node of the given connection. The initial rate limit can be set to an expected bandwidth for the outgoing data traffic, such as may be configured automatically or in response to a user input. For example, the expected bandwidth may be based on a service level agreement (SLA) with an internet service provider (ISP). In other examples, the initial rate can be set based upon a measured bandwidth, such as a by a speed test (e.g., available online at www.speedtest.net) or another expected bandwidth value. As another example, if the expected bandwidth for the given network connection is unspecified, the rate limit may be initialized at 12 to a geometric mean of the lowest rate and the highest rate supported by the physical network interface via which the outgoing data traffic is sent to the network connection.

At 14, a delay interval may be imposed such as corresponding to one or more measurement intervals. For example, the delay interval corresponds to a ping interval that is utilized for sending a ping request from a given network node A to node B via the network connection and receiving the response from node B. The measurement interval can be more than one second, such as five seconds or more. Statistics can be accumulated over an extended period of time that is orders of magnitude greater than the measurement interval. The measurement interval, for example, provides an intermittent time period for continuously sampling quality data that is measured for the given network connection. For example, each quality measurement that is evaluated may include one or more consecutive samples of timing information (e.g., latency or jitter) and/or other quality metrics.

At 16, a determination is made based upon quality measurements obtained for each delay interval that at 14. Specifically, at 16, a determination is made as to whether the quality of the given connection is good, such as by comparing the quality measurement(s) to one or more thresholds. If, based on such comparison, the quality is not determined to be good (NO), the method proceeds to 18. At 18, another determination is made as to whether the quality of the given network connection is poor. If the quality is not determined to be good or poor, following the determinations at 16 and 18, the method takes no action and returns to 14 to impose another delay interval, and obtain another quality measurement. Thus, the method may loop so long as quality has not been determined to be good or poor.

If the determination at 16 ascertains that the quality good, the method proceeds to 20. At 20, a determination is made as to whether there is a demand for more bandwidth. The determination at 20 can be made in response to detecting a number of dropped packets, such as via an application programming interface (API) to access packet dropping function of the rate limiter. For example, if a requisite number of packets are being dropped by the rate limiter during the current or preceding measurement interval, this could be an indicator that there is a demand (e.g., by one or more user or application) for additional bandwidth. If the determination at 20 indicates that there is no demand for additional bandwidth under the good quality condition detected at 16, the method proceeds from 20 to 14 to wait for the next measurement interval without resulting in a change of the current rate limit.

If the determination at 20 indicates that more bandwidth demand is detected, while quality has been determined to be good at 16, the method proceeds to 22 in which the rate limit is increased. As disclosed herein, the rate limit can be increased based on a current rate limit and an upward bound of the rate limit. As an example, the rate limit may be increased at 22 to a value calculated as a weighted geometric mean of the current rate limit and the upward bound. As another example, the rate limit can be increased at 22 based on the expected bandwidth such as in a situation where the expected bandwidth is above the current upward bound of the rate limit. As yet another example, the rate limit 22 may be increased a predetermined percentage of the current rate limit up to the amount of maximum rate limit supported by the physical interface to the given network connection through which the data traffic is sent.

If the quality has been determined to be poor at 18, the method proceeds to 24 to determine whether the throughput is above a specified threshold. For example, throughput data can be obtained from a location along the given connection (e.g., via an API to access a throughput calculator). As one example, throughput can be obtained from the rate limiter in response to a traffic control command, such as the rate of data (e.g., in bits per second) actually flowing through the network interface measured in the same direction as is being controlled by the rate limiter.

Therefore, if the throughput is determined not to exceed the specified threshold of 24, the method proceeds from 24 to 14 to wait an additional delay interval. If based on the determination at 24, the throughput is determined to exceed or otherwise satisfy the threshold, the method proceeds to 26 and the rate limit is decreased. The decrease in rate limit can depend on a variety of factors. As one example, the decrease in rate limit at 26 can be implemented by immediately reducing the rate limit to a corresponding lower bound for the rate limit. The immediate reduction in rate limit to such lower bound enables buffer bloat to clear more rapidly and reduce instances of high latency and poor quality. In other examples, the decrease of rate limit at 26 can be implemented by reducing the rate limit to a geometric or arithmetic mean of the current rate limit and the lower bound. This can result in a more gradual decrease in the rate limit. As yet another example, the decrease in rate limit can be reduced by a prescribed fractional amount (e.g., about 0.5% to about 1% or greater) of the current rate limit. Decreasing the rate limit by a fractional amount can force a rate limit decrease even in a situation when the rate limit is already at the lower bound.

The method 10 can repeat indefinitely to dynamically control the bandwidth by configuring the rate limiter with a selected rate for the given network connection through which data packets are sent out via the rate-limited network interface. In this way, the dynamic bandwidth control method continuously and periodically evaluates inputs and decreases or increases bandwidth, as needed, to find a desirable balance between throughput and quality to help optimize user satisfaction.

Figure 2:
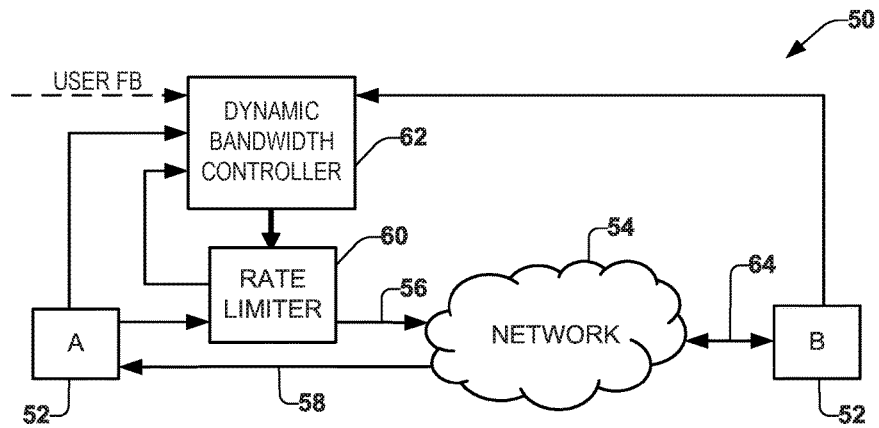
FIG. 2 depicts an example of a system to dynamically control bandwidth for a network connection.

FIG. 2 depicts an example of a system 50 to dynamically control bandwidth for communicating data traffic between network nodes 52, demonstrated as nodes A and B, through a network 54. In the example of FIG. 2, the network 54 includes a given network connection 56 for traffic (e.g., egress or outgoing traffic) flowing from node A through the network 54 to node B and another network connection 58 for traffic (e.g., ingress traffic) flowing from node B to node A through the network. The network 54 can include one or more networks, such as a local area network (LAN), wide area network (WAN) or a combination of any number of one or more networks. The given connections 56 and 58 can be part of the network 54 or otherwise provide access to the network. As an example, the connections 56 and 58 can collectively provide a network connection that is established according to a data plan associated (e.g., via contract or subscription level agreement with a corresponding provider). The data plan can provide for a static or variable bandwidth for egress and ingress traffic with respect to the node 52. For example, the connection 56, 58 can provide data communications via a wired physical link (e.g., coaxial cable, digital subscriber line (DSL) over twisted pair, optical fiber, Ethernet WAN) or a wireless physical link (e.g., wireless metropolitan network (WIMAN), cellular network) for providing bi-directional data communications with respect to node A. As disclosed herein, while a single physical link is shown in FIG. 2, there can be one or more physical links for communicating data traffic with respect to node A, each such physical link employing one or more physical layer technologies to provide for corresponding transmission of data traffic.

In some examples, the portion of the network 54 between the nodes A and B can include the 'last mile' of the telecommunications network for customers, such as corresponding to or including the physical connection from a site to the ISP's main network high capacity infrastructure. It is understood that a particular length of a connection nodes in such an example may not be literally a mile, but corresponds to a physical or wireless connection between a subscriber's site and the service provider network. For instance, a portion of the network 54 thus can correspond to copper wire subscriber lines, coaxial service drops, and/or cell towers linking to cellular network connections (including the backhaul to the cellular provider's backbone network). Portions of the service provider's network beyond the last mile connection tend to correspond to high-speed, high-bandwidth portion of the cloud. For example, node A is located at a site generally at an end of the last mile link and node B is located on the other side of the last mile link, such as connected with one or more networks' high capacity infrastructure. The site can include any number of one or more applications or users that can send and receive data traffic via the network connections 56 and 58.

While the foregoing example describes the node A at an enterprise site and the node B at the other side of a last mile link, in other examples, the node pair can be distributed at other locations of the network, such as intermediate network nodes. For example, nodes A and B can be provided across a peering point where separate WANs (e.g., internet networks) exchange bidirectional traffic between users of the network. As another example an egress/ingress pair, corresponding to nodes A and B, can be provided across a portion of a backbone network that is known to exhibit congestion or failure. Thus, as used herein, the pair of nodes A and B can be provided across any portion of the network or across the entire network.

As demonstrated in the example of FIG. 2, the outgoing connection 56 includes a rate limiter 60 to provide a rate-limited egress connection for node A. A dynamic bandwidth controller 62 implements a state machine (e.g., corresponding to method 10 of FIG. 1) to supply a bandwidth control command to the rate limiter 60 to dynamically adjust the rate limit for the outgoing connection 56. As an example, the rate limiter 60 can be implemented in a rate limited network interface by applying Linux traffic control command via an API or command line function to set the rate limit for outgoing traffic in response to the bandwidth control command. The bandwidth controller 62 continuously monitors one or more inputs to determine one or more quality metrics for the given network connection 56. In some examples, the quality metric can include a measurement of quality, such as timing information, associated with the outgoing connection 56 or both outgoing and incoming connections 56 and 58, respectively.

By way of example, the quality measurement can include a quantitative measure of quality derived from one or more measurement samples that the bandwidth controller compares to one or more quality thresholds. For example implementations that identify quality with multiple samples, each bandwidth controller 62, 90 can employ various thresholds for various numbers of samples, such as disclosed herein. Based on such comparison(s), the bandwidth controller determines if the quality is good (e.g., quality>good quality threshold), poor (e.g., quality<poor quality threshold) or is indeterminate (e.g., quality resides between respective thresholds). As disclosed herein quality and associated quality thresholds can correspond to latency determined by one or more quality metrics implemented by bandwidth controller 62. Throughout this document, "high latency" and "latency is high" refer to a poor quality condition satisfied by one or more samples, such as described above, and "low latency" and "latency is low" refer to a good quality condition satisfied by one or more samples.

As a further example, the bandwidth controller 62 receives inputs from the network node A and the rate limiter 60 to ascertain the quality measurement, corresponding to a measure of latency, as well as to determine throughput and demand for more bandwidth for the network connection. Additionally, in some examples, the bandwidth controller 62 can utilize other quality measurements, such as jitter, packet loss or other metrics that indicate or otherwise affect user satisfaction, other network performance metrics as well as user feedback indicating satisfaction with throughput and quality of service via the network connection.

The bandwidth controller 62 provides the bandwidth control command to the rate limiter 60 for dynamically adjusting the rate for the outgoing connection 56 from node A. For example, the bandwidth controller 62 can provide the bandwidth control command to increase the rate limit or to decrease the rate limit, based on the determined measurement of quality and one or more of throughput or demand for bandwidth via the connection 56. For instance, the bandwidth controller can increase or decrease the rate limit within established upper and lower rate limit bounds. Such bounds can be fixed or, in other examples, may be variable based on the determined quality measurement for one or more intervals. The bandwidth controller thus continuously evaluates inputs and adjusts bandwidth to achieve a desirable balance between quality and throughput. The bandwidth controller thus can accommodate changes in circumstances over time, such as may depend on the types and combinations of traffic from node A to B, other traffic sent from node A to the network 54 not destined for node B, and other traffic present in the network 54 that may affect throughput and quality.

A network connection 64 between node B and the network (e.g., demonstrated as being bi-directional) is shown in FIG. 2 without including rate limiting and dynamic bandwidth control. In other examples, such as shown in system 80 of FIG. 3, an outgoing network connection 84 from node B, which corresponds to the ingress connection 58 to node A, may include a dynamically controlled rate limiter 88.

Figure 3:
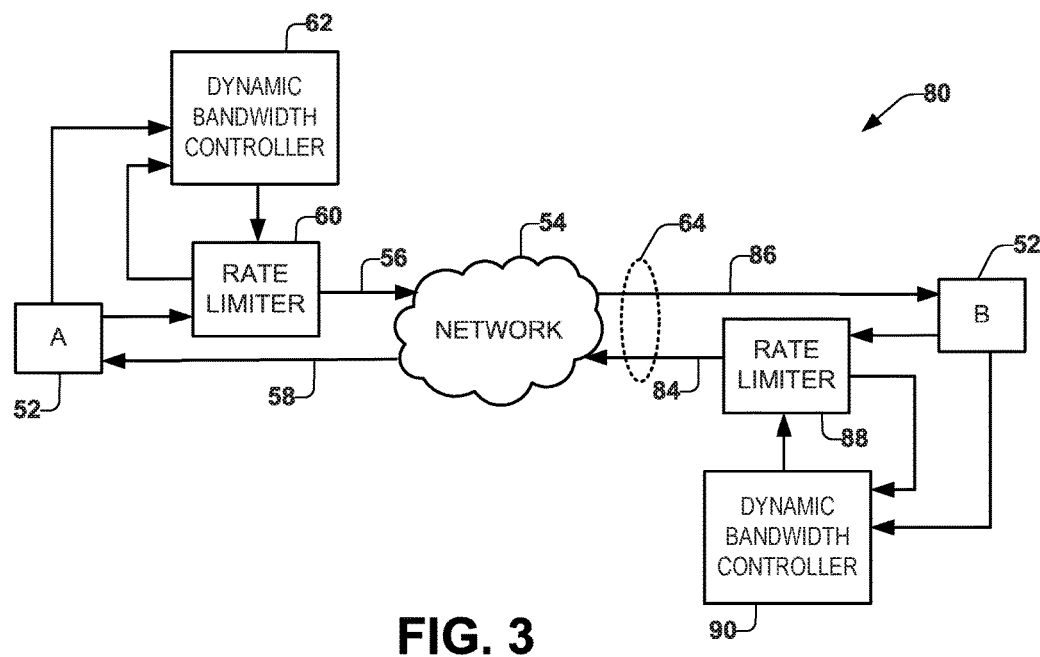
FIG. 3 is an example of a system to dynamically control bandwidth for bi-directional network connections between network nodes.

In the example of FIG. 3, the outgoing network connection 56 for node A is the same as disclosed with respect to FIG. 2, namely, including a rate limiter 60 to control its bandwidth dynamically based on a bandwidth control command from bandwidth controller 62. Also shown in FIG. 3 are the outgoing network connection 84 and incoming network connection 86 for node B for a given network connection with node A. As mentioned, the outgoing connection 84 corresponds to the ingress connection 58 to node A and the incoming connection 86 to node B corresponds to the outgoing connection from node A. In some examples (see, e.g., FIG. 7), connections 56 and 86 are part of a common tunnel for traffic flow from node A to B and connections 84 and 58 are part of the same or another tunnel for traffic from node B to A. Similar to the rate limiter 60 dynamically adjusting the bandwidth for the connection 56, the system 80 employs the rate limiter 88 to dynamically adjust the bandwidth for the connection 84 based on a bandwidth control command supplied by bandwidth controller 90. In this way, system 80 provides bi-directional bandwidth control for the connection between network nodes. That is, the rate limiter 88 implemented at node B dynamically sets the bandwidth for ingress connection 58 to node A and the rate limiter 60 at node A dynamically sets the bandwidth for egress connection from node A.

Continuing with the above example, it is assumed that node A is located at a site generally at an end of the last mile link and node B is located on the other side of the last mile link, such as in the cloud connected with one or more networks' high capacity infrastructure. In this configuration, the rate limiter 88 at node B dynamically controls bandwidth of ingress data traffic from node B to node A (e.g., to the site) and rate limiter 60 at node A dynamically controls egress of data traffic from node A to node B (e.g., from the site). The site can include any number of applications or users that can send and receive data traffic via the network connections 56 and 58. Thus, the bi-directional bandwidth control system 80 dynamically controls bandwidth for traffic flowing both from A to B as well as from B to A based on quality measurements, throughput and demand for bandwidth, such as disclosed herein.

In some examples of a bi-directional bandwidth control system that employs round trip traffic measurements to compute the measurement of quality, a complication may arise because round-trip quality (e.g., round trip latency time) measurements from node A to B and from B to A are correlated, and the dynamic bandwidth controller at each node would tend to respond similarly to the correlated round-trip latencies measured by each. In the bi-directional example, each unidirectional traffic control system is to determine how rate limit changes within the unidirectional system influence quality. For example, each bandwidth controller 62 and 90 measures quality (e.g., a round trip quality measure) after changing its rate limit to determine whether the change improved quality and thus should be retained. Thus, if bandwidth controllers for nodes A and B were to respond similarly and simultaneously to correlated round-trip quality measurements, one bandwidth controller 62 may detect an improvement (or decrease) in quality that was, in reality, due to the rate limit change in the other bandwidth controller 90 and incorrectly retain its rate limit.

To mitigate potential race conditions and incorrectly retaining adjusted rate limits, the bandwidth controllers 62 and 90 can be configured to operate similarly but at different intervals. For example, if one rate limiter (e.g., ingress rate limiter 88 when node A resides at a site) is expected to have the greater impact on user satisfaction than the other rate limiter (e.g., egress rate limiter 60), the rate limiter having the greater expected impact can be programmed to implement dynamic bandwidth adjustments more quickly (e.g., in response to detecting a good or poor quality condition in fewer measurement intervals) than the other rate limiter.

By way of example, assume that node A (and associated bandwidth controller 62 and rate limiter 60) is located near a user, node B (and associated bandwidth controller 90 and rate limiter 88) is located in the cloud, and user satisfaction is more influenced by downstream throughput than upstream throughput, then system for node B is selected to respond first. In the following examples, a bandwidth control system refers to the dynamic bandwidth controller 62 or 90 and rate limiter 60 or 88 associated with node A or associated with node B, as specified or implied by context. Additionally, the bandwidth control system configured to respond first is referred to as system 1, and the system selected to respond second is referred to as system 2.

By way of further example, the timing difference is measured from a time zero event. Criteria to identify the time zero event are selected such that system 1 and system 2 have a high probability of identifying the same event. As one example, the time zero event is poor quality as indicated by the identification of a high round-trip latency condition. In this example, system 1 and system 2 use the same criteria (e.g., a common number of samples and thresholds) to identify the high latency condition.

Additionally or alternatively, the timing difference is implemented by using a different number of samples required to identify a low latency condition at each bandwidth control system for a given network connection. System 1 requires a lower number of samples to identify low latency than system 2. As an example, two samples are used to identify low latency for system 1, and 4 samples are used to identify low latency for system 2. In another example, 2 to N samples are required to identify low latency for system 1, and N+2 to M samples are required to identify low latency for system 2. This can provide sufficient time for system 1 to evaluate how the increase in rate limit for system 1 influences quality before system 2 has time to receive the larger number of samples it requires to detect low latency and respond.

In a representative scenario, high latency is detected simultaneously or nearly simultaneously (based on same number of samples) by system 1 and system 2. The systems may be out of phase by up to one interval, so detection may not be strictly simultaneous. If system 1 and system 2 both measure more than the minimum threshold of throughput, system 1 and system 2 (e.g., their respective bandwidth controllers) will each set its tentative upper bound to its current rate limit and both systems will reduce their respective rate limits. If high latency is detected again, both systems will further reduce each system's rate limit. When low latency is detected, however, system 1 detects low latency first because, in this example, its bandwidth controller uses a smaller number of samples to detect low latency than system 2. Thus, in response to detecting low latency, system 1 (e.g., its bandwidth controller) immediately sets its rate limit to its tentative upper bound. If high latency is detected by system 1 following the detection of low latency, system 1 sets its upper bound to its tentative upper bound, and system 2 fails to detect low latency because it requires a larger number of samples to do so. If system 1 detects low latency instead, it unsets its tentative upper bound. System 2 may then detect low latency and set its rate limit to its tentative upper bound. If high latency is detected next, system 2 sets its upper bound to its tentative upper bound and will continue to reduce its rate limit while high latency continues to be detected. If system 2 detects low latency next instead, it unsets its tentative upper bound. By having system 1 and system 2 operate at different rates and take turns testing a tentative upper bound, each system is able to determine whether its rate limit contributes to high latency.

Figure 4:
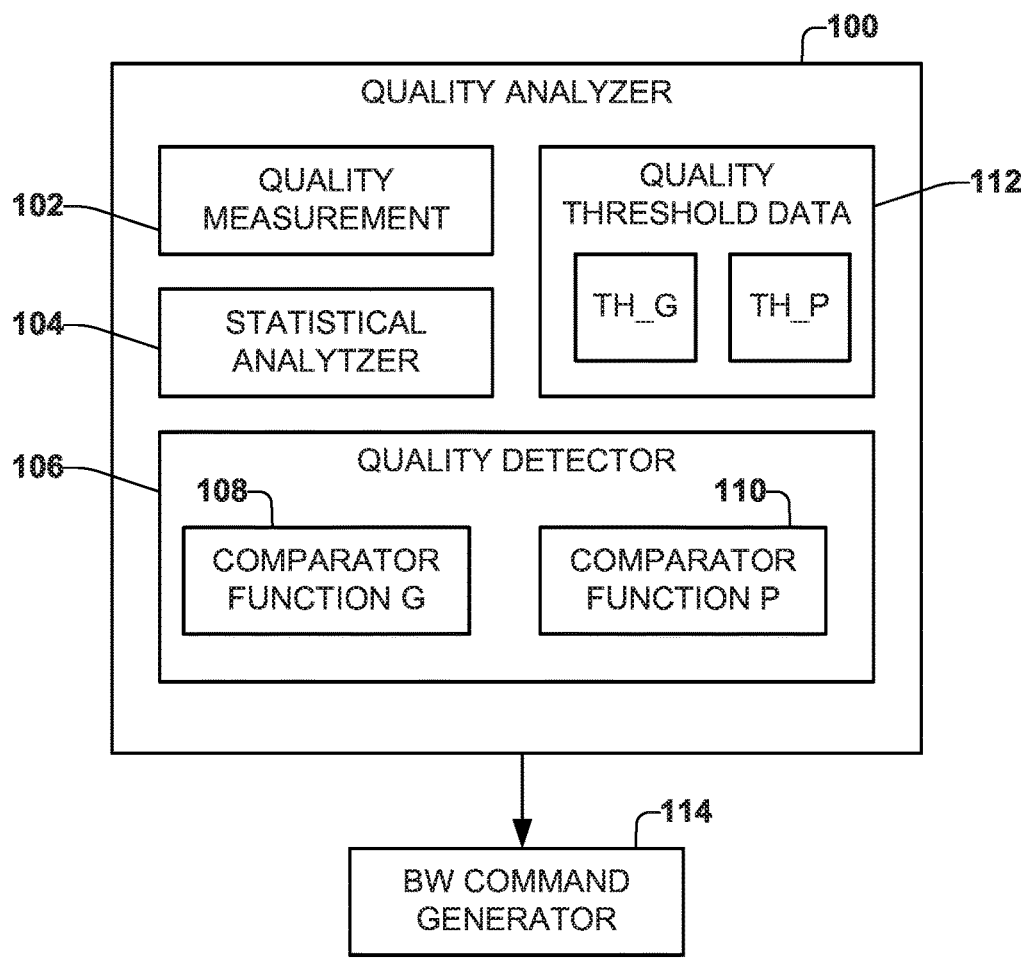
FIG. 4 depicts an example of a quality analyzer to determine a quality metric for adjusting bandwidth.

FIG. 4 depicts an example of a quality analyzer 100 to evaluate a quality metric for dynamically controlling bandwidth. The quality analyzer 100 includes a quality measurement component 102 that computes a quality measurement for a given network connection based on one or more inputs. The inputs may correspond to timing information that is received and/or derived from system resources at respective measurement interval, such as latency, jitter, packet loss or other metrics that can affect user satisfaction or direct user feedback associated with a given network connection.

For example, the measurement component can monitor low frequency pings sent from one network node (e.g., where bandwidth controller and rate limiter reside) to a target network node via the network connection. If multiple network connections exist between the sender and target network nodes, a corresponding ping can be sent via each network connection to the target node at an associated interval, which may be the same or different interval for each network connection. For instance, the ping interval can be set to a default level or be user programmable to a desired time (e.g., about every 5 seconds, every second or another interval). The quality measurement component 102 can compute one or more quality measurements, corresponding to network timing information, based on the round trip time for each of the ping requests and corresponding responses, such as round trip latency. Additionally or alternatively, the quality measurement component 102 may compute one or more other quality metrics, such as jitter or packet loss over a plurality of measurement intervals. The measurement component 102 thus computes the quality measurement from measurement data acquired over time, and the quality measurements are stored in memory.

A statistical analyzer 104 is programmed to compute statistics based on the quality measure(s) determined by the quality measurement component 102. The statistical analyzer 104 is programmed to accumulate statistical information to characterize a distribution of the measured quality for the given network connection over a plurality of measurement samples, each sample defining a measurement interval. The statistical information may be continuously accumulated, such as to characterize the mean and standard deviation of quality measurements over an extended running period of time (e.g., several minutes, hours, etc.). As an example, the statistical accumulator employs a type of accumulation for both mean and standard deviation that varies according to the number of samples, such as by accumulating the statistical information linearly and then switching to exponential accumulation when enough samples are available. The cross-over from linear to exponential is when the next sample would be weighted into the accumulation more with exponential than linear.

Where more than one quality metric is utilized to characterize quality of a given network connection, the statistical analyzer 104 can compute individual statistics for each quality metric. In other examples, the statistical analyzer may compute aggregate statistics for each of the multiple quality metrics, each being weighted according to its assigned relative importance in determining quality for the given network connection. The statistical information that is accumulated thus provides a mean and standard deviation to identify a baseline or normal condition that a set of most recent measurements may be compared to for determining the current quality that is used for dynamically adjusting bandwidth as disclosed herein.

A quality detector 106 evaluates quality measurements for a set of N most recent consecutive of the measurement samples, where N is a positive integer (e.g., N≥1). The quality detector 106 can be programmed to evaluate the N most recent quality measurements based on the computed latency value and accumulated statistical information to determine a quality condition for the given network connection. For example, the quality detector 106 can include comparator functions 108 and 110 to evaluate ascertain an indication of the quality of the given network connection as being in good condition, poor condition or an indeterminate condition. Other numbers and types of conditions could be used to classify the quality of the given network connection.

Each of the comparator functions 108 and 110 is programmed to evaluate each of N most recent quality measurements relative to respective quality thresholds TH_G and TH_P stored in quality threshold data 112. The quality thresholds TH_G and TH_P can be derived based on the standard deviation computed by the statistical analyzer 104 and the number of N measurement samples used to determine each quality measurement. For instance, a different number of standard deviations above or below the mean is used by each comparator function 108 and 110 as a corresponding threshold TH_G or TH_P. The number of standard deviations for each threshold can vary depending on a number of N samples used by the quality measurement component 102 to compute the quality measurement. Thus, each of the comparator functions 108 and 110 thus can employ different thresholds to perform 1 to N comparisons to evaluate each of the N sets of quality measurements. In other examples, a single threshold can be used for evaluating each of the N sets of quality measurements regardless of N. If the good quality comparator function 108 determines that any of the respective thresholds TH_G in threshold data 112 are satisfied (e.g., from comparing quality measurements and respective thresholds), a good quality condition exists. Similarly, if the poor quality comparator function 110 determines that any of its associated thresholds TH_P stored in threshold data 112 are satisfied (e.g., from comparing quality measurements and respective thresholds), a poor quality condition exists.

The quality analyzer 100 thus provides the computed indication of quality to a bandwidth command generator 114. The bandwidth command generator 114 and the quality analyzer 100 thus cooperate to function as a dynamic bandwidth controller, such as the dynamic bandwidth controller 62 (e.g., operating as a state machine that performs method 10). In other examples, the bandwidth command generator 114 could implement the state machine function separately from the quality analyzer 100, and the quality analyzer and other metrics could provide inputs to the bandwidth command generator which generates the next rate limit, such as disclosed herein. The bandwidth command generator 114 further evaluates the computed indication of quality and other inputs, such as including an indication of throughput and a demand for additional bandwidth, and provides the bandwidth control command based on such evaluation. Thus, as the quality condition and the other inputs (e.g., throughput and bandwidth demand) vary over time, the bandwidth control command instructs the rate limiter to decrease or increase bandwidth, as needed, to balance throughput and quality for increasing user satisfaction. As disclosed herein, the bandwidth command generator 114 can employ an upper and lower bounds to help constrain bandwidth adjustments. The optimal balance may change over time, such as depending on the types and combinations of traffic communicated over the network connection.

Figure 5:
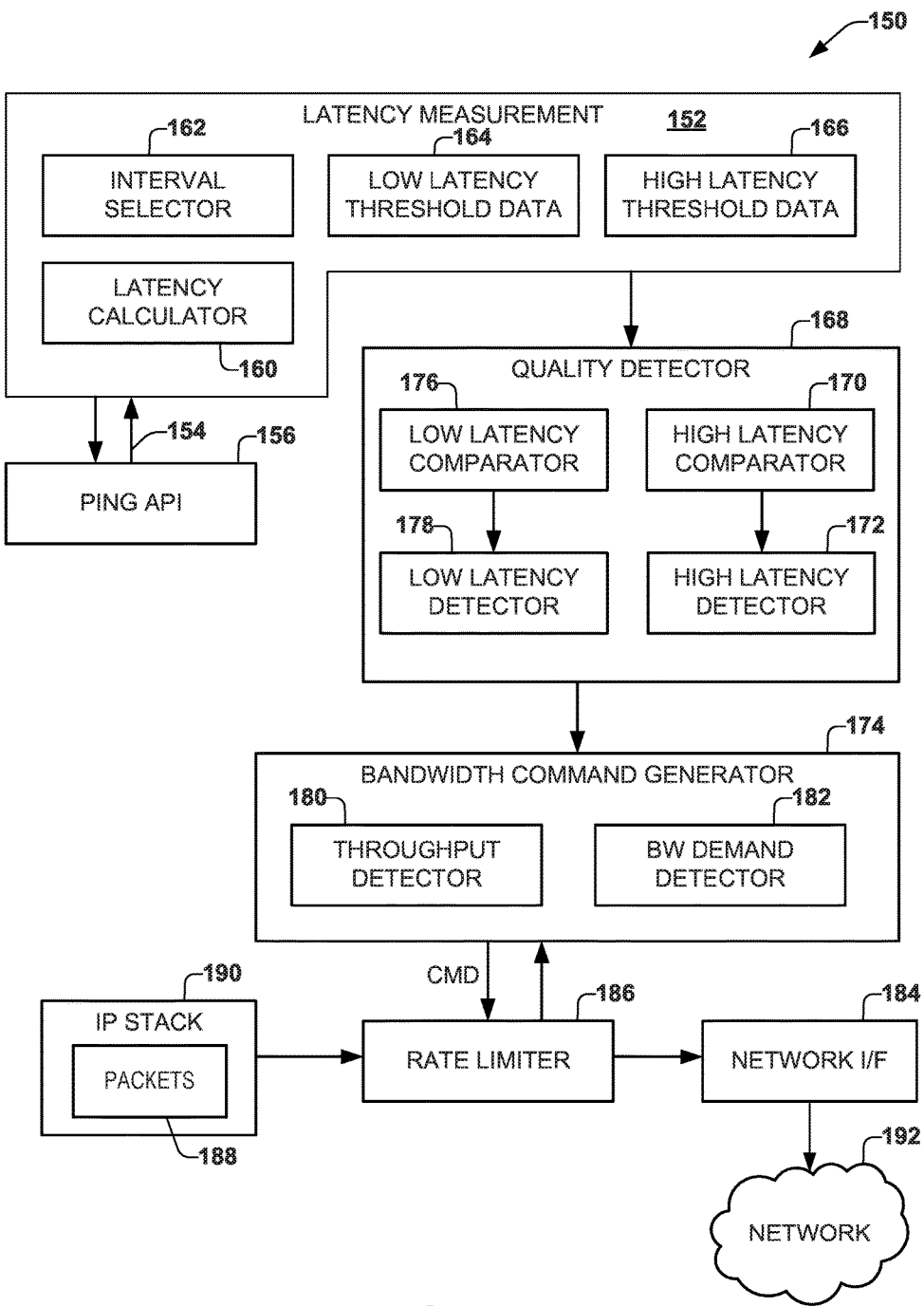
FIG. 5 depicts an example of a quality measurement and detection system 150 that employs latency as a quality metric.

As a further example, FIG. 5 depicts an example of a quality measurement and detection system 150 that employs latency as a quality metric. The system 150 includes a latency measurement component 152 that is coupled to receive timing information 154 via a ping API 156. The ping API 156, for example, can access an Internet Control Message Protocol (ICMP) control function or other protocol control function to measure timing information that provides a quality measurement.

In some examples, the latency measurement component 152 can leverage a control message echo request that is sent via the given network connection (e.g., through network interface 184) for another purpose. In other examples, the latency measurement component 152 can employ the API 156 or other command to send the echo request or other control message at an interval established by interval selector 162 specifically for use by the latency measurement component 152. Regardless of whether the echo request is used for other purposes or specifically for the latency measurement component 152, the latency measurement component 152 can utilize the request and responses to determine quality of the given connection based on a set of measurements, such as disclosed herein. When ICMP echo requests are not available for other purposes, the latency measurement component 152 can measure quality, such as round trip latency, by implementing other timing measurements, such as ICMP timestamp requests, UDP echo requests, http ping requests, TCP echo requests or the like.

As a further example, the ping API 156 can control network resources to send a control command request to a predefined network node and compute timing information 154 in response to a response received from such network node corresponding to the request. With reference back to the example of FIG. 1 or 2, the request can be sent from node A to far-end node B or from node B to its far-end node A. Also, as discussed with respect to FIG. 4, statistical analysis can be performed on the timing information 154 over a plurality of measurement intervals, such as by computing a mean and standard deviation for latency. Thus, latency measurement component 152 can include a latency calculator 160 to compute latency, such as a round trip time latency, based on the timing information 154 received the ping API 156.

The computed latency measurements can be analyzed over time by a statistical analyzer (e.g., statistical analyzer 104 of FIG. 4) to store statistical information related to the computed latency values over a plurality of measurement intervals. For instance, latency data can be stored in memory along with the corresponding statistical information that is continuously updated based upon pings that are sent via the network connection. The latency measurement and component 152 can also include an interval selector 162 to select a number N of the most recent latency samples for use in determining the current quality of the network connection. The interval selector 162 can use the same number N of the sample intervals for analyzing the latency data for a low latency condition and a high latency condition. In other examples, different number of samples may be used for evaluating high and low latency conditions. The latency measurement further utilizes low latency threshold data 164 and high latency threshold data 166. Each of the data 164 and 166 stores a number of one or more thresholds for evaluating a number of one or more respective latency measurements as defined by the interval selector 162.

The system includes a quality detector 168 to ascertain one or more quality condition. The latency measurement component 152 and quality detector collectively can correspond to functions of quality analyzer 100 of FIG. 4 as well as other quality analysis functions disclosed herein. In the example of FIG. 5, the quality detector 168 is programmed to analyze the latency measurements to identify a low latency condition, a high latency condition or a predetermined latency condition for a given network. As an example, the quality detector 168 includes a high latency comparator that utilizes the thresholds stored in the high latency threshold 166 to evaluate whether a high latency condition exists. For example, a high latency comparator 170 compares each 1 to N sets of latency measurements with a corresponding latency threshold to ascertain whether a latency condition exists. Assuming, for example, that N=4, each of the four most recent latency sample measurements are evaluated by the quality detector 168 to ascertain whether a high latency condition exists. The high latency comparator 170 thus compares a first of N samples to a corresponding 1-sample threshold, a next sample that includes two samples is compared to a corresponding 2-sample threshold, a three sample latency measurement is compared to a corresponding 3-sample threshold, and a four sample is compared relative to its respective 4-sample threshold.

In some examples, the thresholds are inversely related to the number of latency measurement samples evaluated by the comparator for each latency sample set. For instance, a threshold for a single measurement sample is greater than each threshold that is applied to latency that includes two or more measurement samples. In other examples, a single threshold can be applied to each of the different 1 to N latency measurements regardless of the measurement number samples. If the high latency comparator indicates that any of the thresholds are satisfied the high latency detector 172 indicates the occurrence of a high latency condition to a bandwidth command generator 174.

As a further example, the low latency condition can also be identified by a number of M consecutive latency measurements, where M may be the same or different number of samples (N) that is used by the high latency comparator 170. To evaluate the low latency condition, the quality detector 168 also includes a low latency comparator function 176. The low latency comparator 176 includes a comparator function to evaluate each of the 1 to M consecutive latency values (e.g., computed by latency calculator 160). The number of standard deviations below or above the statistical mean is calculated for each computed latency. Values below the standard deviation may be represented by negative numbers and valued above the standard deviation by positive numbers. Similar to the high latency analysis implemented by detector 168 (e.g., comparator function 170 and detector 172), a different threshold number of standard deviations below or above the mean can be used for each number of the most recent consecutive latency samples from 1 to M. Each set of consecutive latency samples can thus have its own low latency threshold that is stored in the low latency threshold data 164. The low latency comparator 176 thus compares each of the 1 to M latency measurement relative to the low latency threshold. If any of the latency thresholds are satisfied, the low latency detector 178 can identify the occurrence of a low latency condition for a given network. The quality detector 168 thus can provide an indication to the bandwidth command generator 174 in response to detecting the occurrence of a low latency condition, a high latency condition or a condition that is indeterminate such as in response to no latency threshold being satisfied by the analysis.

In this example, the detection of a low latency condition can correspond to a good quality condition and quality can be specified as being poor in response to detecting a high latency condition. The bandwidth command generator 174 also includes a throughput detector 180 and a bandwidth demand detector 182. The throughput detector 180, for example measures current throughput (e.g., in bits per second) based upon the network traffic flowing through the network interface 184 for the given network connection. A bandwidth demand detector 182 can detect if more demand for bandwidth exists via the given network connection. For example, the bandwidth demand detector can ascertain demand for more bandwidth by measuring packets dropped by the rate limiter 186 based upon the current rate limit. As an example, the rate limiter can be implemented in an operating system kernel to drop packets as necessary to keep the data rate below the rate limit that is specified by the bandwidth command generator 174.

The bandwidth command generator 174 provides a bandwidth control command (CMD) to the rate limiter 186 for controlling bandwidth of a given connection of outbound data packets 188 for one or more network sessions that reside in an IP stack 190. As disclosed herein, the command generator 174 generates the command CMD based on the quality condition for the given network connection determined by a quality detector 168 as well as based upon the throughput detected by the throughput detector 180 and the bandwidth demand determined by the bandwidth demand detector 182. The rate limiter 186 thus operates to pull data packets 188 from the corresponding IP stack 190 and sends such packets via the network interface 184 for sending to the corresponding target node, as disclosed herein.

As a further example, the rate limiter 186 and IP stack may be implemented at the OS kernel level. Additionally, in some examples, the OS kernel implements the command generator 174 of the dynamic bandwidth control function to provide the control command (CMD) to the rate limiter 186 or the command may be provided to the OS kernel via a kernel level API. For example, the packets in the IP stack 190 are provided from one or more applications (not shown, but see, e.g., FIG. 7) that provide outbound data traffic to one or more remote endpoints (e.g., remote applications executing on respective processing devices). For example, the application(s) can be executed by one or more processors operating (physically and/or logically) within a site where the system 150 is implemented. In other examples, the application can be implemented in another computing device remote from the site where the corresponding packet is received over a corresponding network, such as a wide area network (e.g., the internet). An input interface (not shown) can provide the outbound packets from the stack 190 to the OS kernel for processing by rate limiter 186 according to the command. The packets 188 in the IP stack 190 thus are outbound packets to be sent via a corresponding network connection 192.

Figure 6:
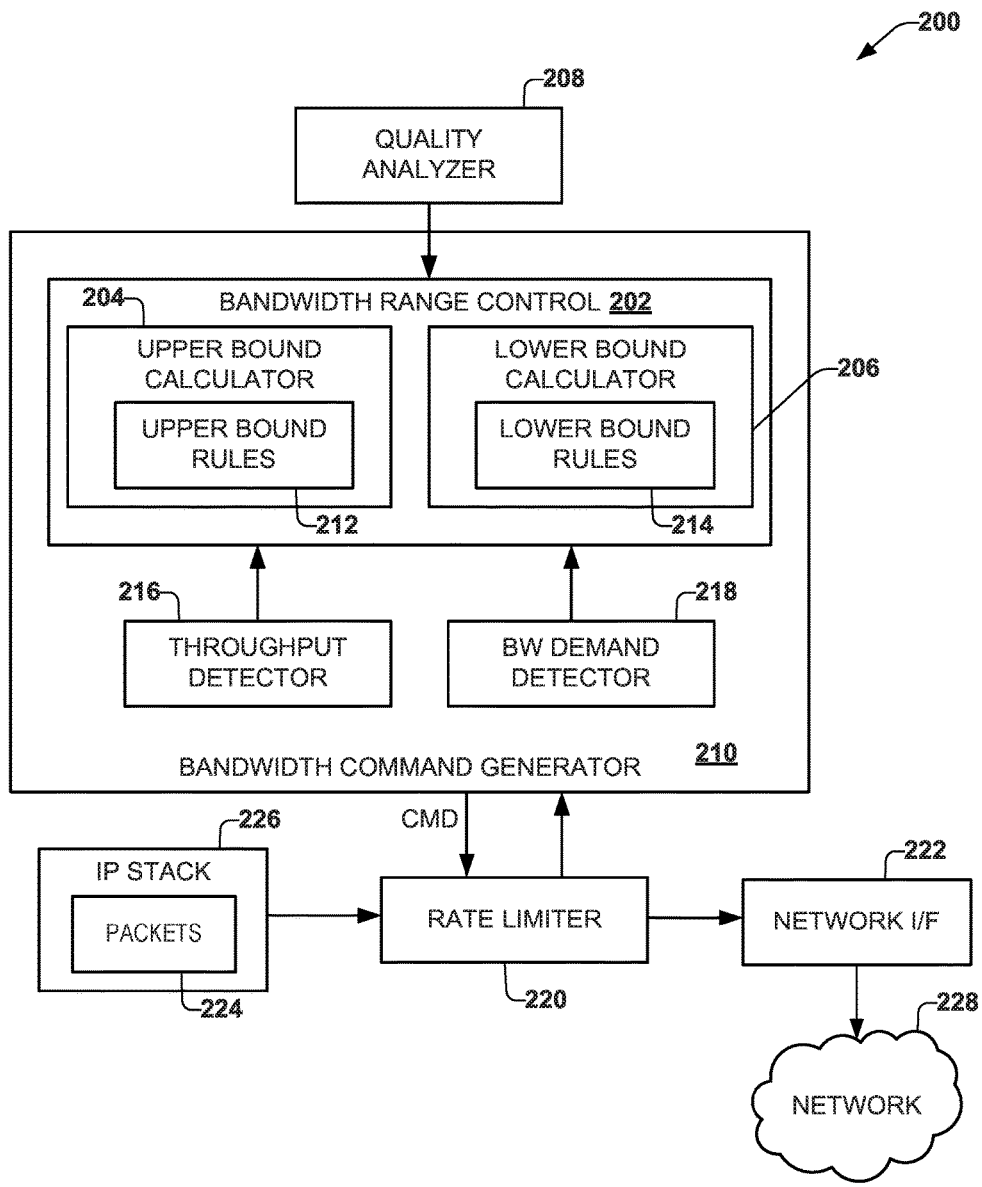
FIG. 6 depicts part of a bandwidth controller for setting upper and lower bounds for a rate limit that is used in dynamically adjusting bandwidth for a network connection.

FIG. 6 depicts part of the bandwidth controller (e.g., including quality detection functions) for setting upper and lower bounds for a rate limit that is used in dynamically adjusting bandwidth for a network connection. The system 200 includes bandwidth range control 202 to establish upper and lower bounds that are applied to constrain the dynamic adjustments to the bandwidth rate limit. Bandwidth range control 202 includes an upper bound calculator 204 and a lower bound calculator 206 to determine respective upper and lower bounds. The bandwidth range control 202 receives an indication of a quality condition from quality analyzer 208. Quality analyzer 208 can implement correspond to functions of quality analyzer 100 of FIG. 4 as well as other quality analysis functions disclosed herein. For example, as disclosed with respect to FIG. 5, the quality analyzer 208 can implement compute latency metrics, such as including high and low latency detectors (e.g., detectors 172 and 178), to provide an indication of latency based on latency measurements (e.g., corresponding to latency measurement function 152). The quality analyzer 208 thus specifies the occurrence at a low latency condition, a high latency condition or an indeterminate latency condition for each set of latency measurements.

While the bandwidth range control 202 is demonstrated as part of the bandwidth command generator, in other examples, the range control may be implemented separately. In the example of FIG. 6, the upper bound calculator 204 includes upper bound rules 212 that establish policy and logical conditions for controlling how to compute the upper bound for the rate limit. Similarly, the lower bound calculator 206 includes lower bound rules 214 to establish policy and logical conditions utilized to compute the lower bound for the rate limit. Each of a throughput detector 216 and a bandwidth demand detector 218 also provide inputs to the bandwidth range control 202 that can be utilized selectively by the respective calculators 204 and 206 according to the respective rules 212 and 214.

As an example, bandwidth range control 202 can initially set the upper and lower bounds such as to a predetermined percentage (e.g., ±10%) of an initial rate limit established for the given connection by rate limiter 220. For example, the upper bound can be initialized to evaluate is greater than or equal to the initial rate limit. The lower bound similarly can be initialized to evaluate its less than or equal to the initial rate limit.

Each of the upper bound calculator 204 and the lower bound calculator 206 can also receive as inputs the current rate limit that is utilized by the rate limiter 220 in response to the bandwidth control command CMD provided by the command generator 210. As an example, the lower bound calculator 206 utilizes rules 214 to decrease the lower bound by setting it to the rate limit in response to detecting the rate limit is reduced below the lower bound. The upper bound calculator 204 can also employ the rules 212 to increase the upper bound by setting it to the rate limit when the rate limit is increased to above the upper bound. Thus the lower bound rules can maintain the property that the lower bound is always less than or equal to the rate limit. Similar the upper bound rules 212 can specify that the upper bound is always greater than or equal to the rate limit.

The lower bound calculator 206 further can increase the lower bound based on the measured throughput and detecting a good quality condition for the given network. For example, lower bound rules 214 can be employed by the lower bound calculator to set the lower bound to the measured throughput determined by throughput detector 216 if the measured throughput is greater than the current lower bound and the quality analyzer 208 indicates that latency is low. In this way, the lower bound can represent the highest throughput measured when latency is low and quality is good.

The upper bound rules 212 further can be applied by upper bound calculator 204 to decrease the upper bound to a new upper bound when the new upper bound is less than the current upper bound such as described herein below. The new upper bound is identified based upon the rules 212 when a high latency condition consistently occurs at the given rate limit. In this way, the upper bound represents the lowest rate limit for which latency is high and quality is poor.

By way of further example, the upper bound calculator 204 can identify a new upper bound by first identifying a tentative upper bound. For instance, when quality analyzer 208 determines that latency is high and throughput is above a minimum threshold (e.g., determined by throughput detector 216), a tentative upper bound is set. In such circumstances, for example, upper bound calculator 204 sets the tentative upper bound to the current rate limit. In another example, upper bound calculator 204 sets the tentative upper bound to measured throughput. The minimum threshold used by the throughput detector 216 may be set to the minimum rate limit allowed by the system. In other examples, the minimum threshold is the current lower bound.

As still a further example, in response to detecting the high latency condition, which triggers the upper bound calculator 204 to identify a tentative upper bound, the rate limit is reduced. If quality analyzer 208 detects high latency again, the rate limit is further reduced and the bandwidth controller continues this process until quality analyzer 208 detects that low latency occurs. After detecting low latency, the rate limit is set to the tentative upper bound. If high latency is detected again, the upper bound calculator 204 sets the upper bound to the tentative upper bound. If low latency is detected during a subsequent measurement interval before detecting another high latency condition, the tentative upper bound is unset and the bandwidth control command returns to its previous value. The rate limit further remains at the tentative upper bound until quality analyzer 208 detects either low latency (e.g., tentative upper bound is unset) or high latency (e.g., tentative upper bound is confirmed (e.g., by range control 202) and the upper bound is set). For example, the bandwidth range control 202 follows this process once to confirm a new upper bound by quality analyzer 208 detecting a high latency condition in a subsequent measurement interval before a low latency condition. In other examples, this process is repeated by bandwidth range control 202 more than one time to test and confirm the new upper bound.

As mentioned, the rate limiter 220 sets a rate limit in response to the control command CMD to dynamically control bandwidth of data traffic supplied to a given network connection by a network interface 222. The rate limiter 220 and/or IP stack 226 may be implemented at the OS kernel level or at the application level. Additionally, in some examples, the OS kernel implements the command generator 210 to provide the control command (CMD) to the rate limiter 186 or the command may be generated at the application level and passed to the OS kernel via an kernel-level API.

Similar to the example of FIG. 5, the packets 224 in the IP stack 226 are provided from one or more applications (see, e.g., FIG. 7) that provide outbound data traffic flows, corresponding to one or more respective network sessions, to one or more remote endpoints (e.g., remote applications executing on respective processing devices). For example, the application(s) can be executed by one or more processors operating (physically and/or logically) within a site where the system 200 is implemented. In other examples, the application can be implemented in another computing device remote from the site where the corresponding packet is received over a corresponding network, such as a wide area network (e.g., the internet) or local network (e.g., intranet). An input interface (not shown) can provide the outbound packets from the stack 226 to the OS kernel for processing by rate limiter 220 according to the command. The packets 224 in the IP stack 226 thus are outbound packets to be sent via rate-limited network interface 222 over the given connection of network 228.

Figure 7:
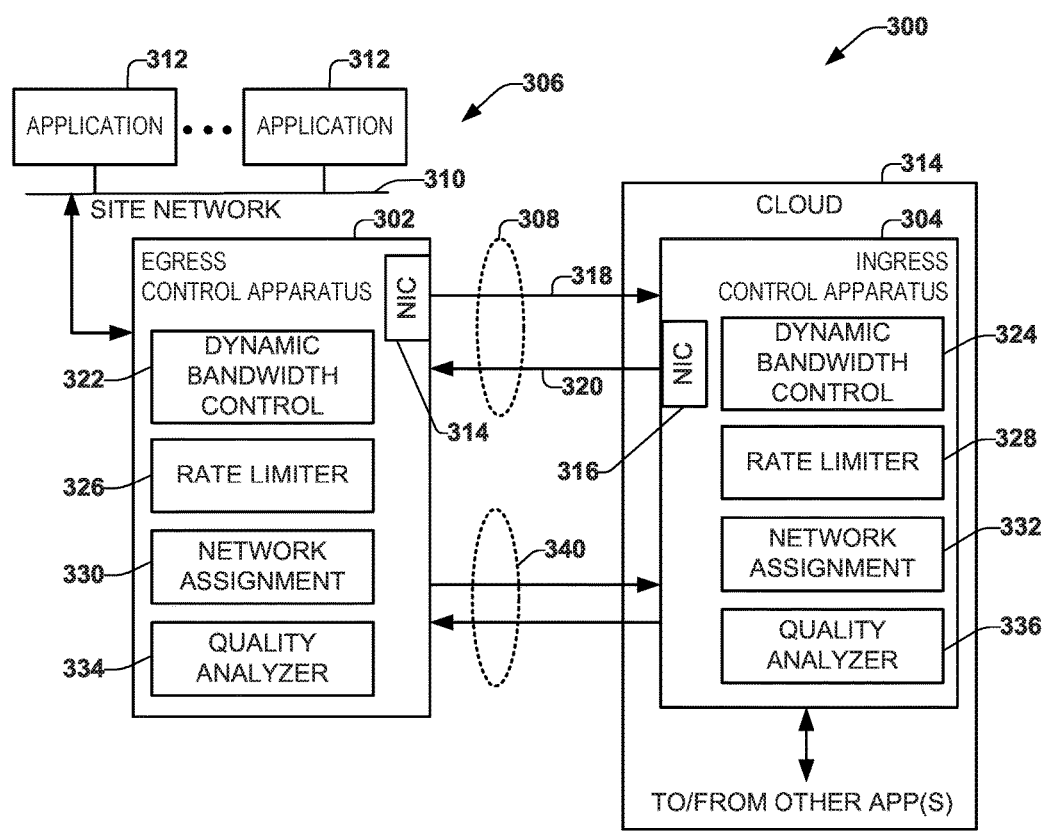
FIG. 7 demonstrates a system to provide for bi-directional traffic control.

FIG. 7 depicts an example of a communication system 300 that includes an egress control apparatus (also referred to as a site apparatus) 302 and an ingress control apparatus (also referred to as a cloud apparatus) 304 that are configured to for providing bi-directional traffic control with respect to a corresponding site 306. The terms ingress and egress are used in the example of FIG. 7 to refer to a direction of traffic flow with respect to the site 306. As used herein, a site can refer to a location and/or equipment that can access one or more connections 308, 340 (e.g., internet or intranet). For example, a site can be an enterprise, such as an office, business or home that includes a set of computing devices associated with one or more users. As another example, a site can be an individual user, such as may have access to one or more data networks (e.g., Wi-Fi network and/or cellular data network) via one or more devices, such as a smart phone, desktop computer, tablet computer, notebook computer or the like.

Each of the egress control apparatus 302 and the ingress control apparatus 304 correspond to a network node, such as disclosed in other examples (e.g., nodes A and B of FIGS. 2 and 3). Each control apparatus 302 and 304 may be an endpoint or intermediate node in the system 300. In the example of FIG. 7 each of the egress control apparatus 302 and the ingress control apparatus 304 communicates with each other through one or more network connections 308 and 340.

Each of the connections 308, 340 can provide data communications via a wired physical link (e.g., coaxial cable, digital subscriber line (DSL) over twisted pair, optical fiber, Ethernet WAN) or a wireless physical link (e.g., wireless metropolitan network (WIMAN), cellular network) for providing bi-directional data communications with respect to the site 306. For example, each such physical link can employ one or more physical layer technologies utilized by respective network interfaces 314 and 320 to provide for corresponding transmission of data traffic via each of the respective the connections 318 and 320.

In some examples, such as where the site provides data communication for a plurality of applications, users and/or user devices, the site can also include a local site network 310. For example, one or more applications 312 can be implemented at the site 306 for communicating data with one or more other external applications (e.g., an end user application or service) via the site network 310 through the egress control apparatus 302. Such external application(s) can be implemented within a corresponding computing cloud (e.g., a high speed private and/or public wide area network, such as including the internet) 314. The corresponding computing cloud 314 may be private or public, or at a private data center or on servers within another enterprise site. Each of the respective applications 312 or external applications/services can be implemented as machine executable instructions executed by a processor or computing device (e.g., the IP phone, tablet computer, laptop computer, desktop computer, server or the like).

In the example of FIG. 7, the egress control apparatus 302 and the ingress control apparatus 304 define an egress/ingress pair that can be distributed across any portion of the network. As a practical matter, the egress/ingress pair tends to realize performance improvements when located in the network across transitions from high to low capacity or other locations that present quality and/or capacity issues (e.g., bottleneck locations).

As an example, the network connections 308, 340 can provide internet or other wide area connections according to a data plan associated with the site (e.g., via contract or subscription to one or more internet service providers). For example, each data plan for a given service provider can be designed to provide the site (e.g., a customer) an estimated amount of upload bandwidth and another amount of download bandwidth. While a service provider may provide the static bandwidth in terms of maximum or "guaranteed" bandwidth, in practice, each of the connections 318 and 320 can become saturated with data near its current rate limit which can result in interactive data, such as video or other media streams, developing excessive jitter and lose packets resulting in poor quality.

To help improve quality, as a further example, each of the egress control apparatus 302 and the ingress control apparatus 304 includes a rate-limited network interface 314 and 316, respectively, to communicate outgoing data over a corresponding network connection 318 and 320, corresponding to bi-directional connection 308. The network interfaces 314 and 316 receive commands or other instructions to limit the bandwidth of data traffic flowing from one control apparatus 302 to the other 304.

As a further example, each of the egress control apparatus 302 and the ingress control apparatus 304 can include hardware and machine-executable instructions (e.g., software and/or firmware) to implement a dynamic bandwidth controller 322 and 324, a rate limiter 326 and 328, a network assignment control 330 and 332, respectively. Each control apparatus 302 and 304 also includes a separate instance of dynamic bandwidth controllers 322 and 324 (e.g., implementing the method 10, and/or corresponding to bandwidth controller 62) for dynamically controlling bandwidth of traffic flowing from each rate-limited interface network interface. The rate limiter 326, 328 (e.g., rate limiter 60) operates to set a corresponding bandwidth limit for outgoing traffic sent from its respective network interface 314, 316 based on the bandwidth control command generated by its associated bandwidth controller 322, 324. Each bandwidth controller 322, 324 further provides the bandwidth control command based on quality measurements determined by a respective quality analyzer 334, 336, such as disclosed herein (e.g., quality analyzer 100, 168, 208).

Each network interface 314, 316 may be implemented as a physical interface or virtual interface. For the example where each network interface 314, 316 is virtual interface, the network connection 308 is implemented as corresponding a tunnel between the respective control apparatuses 304 and 304. For instance, the tunnel encapsulates egress packets sent over network connection 318 with a new header that specifies the destination address of the ingress control apparatus 304, allowing the packet to be routed to the ingress control apparatus before going to its ultimate destination included in each of the egress packets. When more than one link shares capacity, such as multiple virtual tunnels through a single physical link, a single dynamic bandwidth controller may be used for all links sharing the same capacity.

In response to data packets received from the egress control apparatus 302, the ingress control apparatus 304 removes packets from the tunnel, strips off the tunnel IP header, and performs a routing function to send the packet to the destination application according to the original packet header information (e.g., based on the defined destination address). This packet readdressing mechanism allows traffic to flow from the site application to its destination via the remote ingress apparatus 304. To enable receipt of incoming traffic originating from an external application to the cloud ingress control apparatus, instead of the application at the site, the site's application DNS can be modified (e.g., by the ingress or egress control apparatus, or the site administrator) to the IP address of the ingress control apparatus 304. Thus the site will receive incoming connections via the ingress control apparatus. While the foregoing traffic flow was explained mainly from the perspective of the egress control apparatus 302, the ingress control apparatus 304 operates in a substantially similar manner with respect to the ingress data packets sent to the site (e.g., site applications 312). For instance, a similar encapsulation can be implemented for ingress packets sent from ingress control apparatus 304 via interface 316 and network connection 320 to the egress control apparatus 302.

The egress control apparatus 302 operates to control outbound data packets that are sent from the site 306, such as from the applications 312, the network 310 or the apparatus itself to another resource (e.g., an application executing on a device, such as a computing device). Specifically, the egress control apparatus 302 controls sending data packets via one or more outgoing connections 318 of the network 308. Similarly, the ingress control apparatus 304 controls and manages ingress of data packets to the site 306 via one or more ingress links of the network connection.

In some examples, the portion of the network 308 between the egress control apparatus 302 and the ingress control apparatus 304 includes the 'last mile' of the telecommunications network for customers, such as corresponding to or including the physical connection from the site 306 to the provider's main network high capacity infrastructure. While the foregoing example describes the egress apparatus at an enterprise site and the ingress apparatus at the other side of a last mile link, in other examples, the egress/ingress pair can be distributed at other locations of the network. For instance, an egress/ingress pair 302, 304 can be provided across a peering point where separate WANs (e.g., internet networks) exchange bi-directional traffic between users of the network. As yet another example an egress/ingress pair 302, 304 can be provided across a portion of a backbone network that is known to exhibit congestion or failure. Thus, as used herein a given egress ingress pair can be provided across any portion of the network or across the entire network.

As mentioned, in some communications systems, the network connection 308 includes a plurality of different, separate physical connections from one or more service providers. Given multiple distinct network connections 308, 340 may be implemented between egress and ingress control apparatuses 302 and 304, each data flow can be assigned to a corresponding session. Each network assignment control 330 and 332 further operates to selectively assign and/or re-assign each session to a respective one of the network connections, such as by specifying its network interface.

As used herein, a session refers to a persistent logical linking of two software application processes (e.g., running as machine executable instructions on a device), which enables them to exchange data over a time period. A given session can be determined strictly by examining source and destination IP addresses, source and destination port number, and protocol. For example, transmission control protocol (TCP) sessions are torn down using protocol requests, and the link quality manager closes a session when it sees the TCP close packet. As another example, user datagram protocol (UDP) packets are part of one-way or two-way sessions. A two-way session is identified in response to the network assignment control 330, 332 detecting a return packet from a UDP session, and is closed when there is no activity for some prescribed number of seconds. Sessions that have no return packets are one-way and are closed after, typically, a shorter number of seconds. An operating system kernel for each apparatus 302, 304 thus can open and close sessions.

In some examples where a plurality of different network connections form the egress connection (e.g., an aggregate egress connection) 318 in the network 308, the network assignment control 330 can assign each session to a given network connection when it is created. Similarly, where a plurality of different network connections form the ingress connection (e.g., an aggregate ingress connection) 320 in the network 308, the network assignment control 332 assigns each new session to a given network connection. Typically, each respective session uses the same network 308 or 340 for outbound and inbound traffic at each control apparatus 302, 304. The network assignment control 330 and 332 can store assignment of sessions to a network (e.g., as a sessions table or other data structure) in non-transitory memory. Examples of some approaches that the network assignment control 330, 332 can use to assign sessions to one of the network connections based on the quality analyzer 334, 336 can include a round robin assignment, a capacity and/or load-based assignment (i.e., "weighted round robin"), a static performance determination or dynamic capacity determination.

The assignment for each session remains fixed for all data packets in that session until, if circumstances warrant, the network assignment control 330 and 332 reassigns the session to another of the plurality of available networks in the aggregate connection. Thus, in addition to assigning a given session to a respective network to which it will remain assigned for all subsequent packets in the given session, the network assignment control 330, 332 can also reassign a session, such as based on the quality measurements provided by quality analyzer 334, 336 and/or other factors.

As a further example, packets in certain sessions can be identified to be high priority packets, such as corresponding to interactive data traffic (e.g., real time voice, audio and/or video). In certain conditions, as defined by a set of rules, network assignment control block 330, 332 can reassign a session from a current connection 308 to a different network connection 340. For example, when it has been determined that quality and throughput over the currently assigned network (e.g., 318 or 320) cannot be maintained for timely delivery of outbound packets in a given session, the network assignment control block 330, 332 can reassign the given session to a different available network (e.g., network 340). For example, the determination to reassign can be made in response determining the occurrence or repeated occurrence of a poor quality condition (e.g., high latency) for the currently assigned network. Some examples of this and other functionality implemented by network assignment control 330 and 332 to selectively assign and/or reassign sessions are disclosed in U.S. patent application Ser. No. 15/148,469, filed 6 May 2016, and entitled BIDIRECTIONAL DATA TRAFFIC CONTROL, which is incorporated herein by reference.

As mentioned, there may be more than one network connection between each apparatus 302 and 304. In the case of multiple network connections, each network connection would include a separate instance of the dynamic bandwidth controller, rate limiter, network assignment control and quality measurement, which cooperate, as disclosed herein, to perform dynamic bandwidth control and session assignment.

In some examples, the quality analyzer 334, 336 can be programmed to vary quality metric, adjust the number of samples or thresholds used to determine quality thereof based on a type of traffic. For instance, each of the egress and ingress control apparatus 302, 304 can include machine-readable instructions to evaluate packet information (e.g., IP headers) to categorize the packet according to the type of traffic to which the packet belongs. Such packet categorization can be utilized to control how quality is analyzed and/or how dynamic bandwidth control is applied to adjust a rate limit.

As will be appreciated by those skilled in the art, portions of the systems and methods disclosed herein may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What are disclosed herein are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims.

As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. One or more non-transitory media to store machine readable instructions, which are executable by one or more processors, the instructions configured to:
   provide a quality measurement for a given outgoing network connection from one network node to another of network node, wherein the instruction to provide the quality measurement are further to
      accumulate statistical information to characterize a distribution of quality measurements over a plurality of measurement intervals;
      compute the quality measurement from measurement data acquired over N consecutive of the measurement intervals, where N is a positive integer greater than or equal to 1;
      compare each computed quality measurement to a threshold derived from N and the accumulated statistical information; and
      determine a quality condition based on the comparison;
   provide a bandwidth control command that is dynamically adjusted over time based on the quality condition and at least one of throughput or demand for bandwidth of the given outgoing network connection; and
   adjust a rate limit for the given outgoing network connection based on the bandwidth control command.

2. The media of claim 1, wherein the given outgoing network connection is one of a plurality of available network connections, the wherein the instructions further comprise instructions to at least one of assign a session of data traffic to the given outgoing network connection or to re-assign the session of data traffic to another of the plurality of available network connections based on the quality measurement.

3. The media of claim 1, wherein each of the measurement intervals is greater than one second.

4. The media of claim 1, wherein the instructions to compute the quality measurement further comprise instructions to compute latency of a packet communicated over the given outgoing network connection for each of the plurality of measurement intervals, the computed latency corresponding to the quality measurement for each measurement interval.

5. The media of claim 4, wherein the packet communicated over the given outgoing network connection comprises a request message that is sent via a control message protocol from the one network node to the other network node and a corresponding reply message sent via the control message protocol from the other network node to the one network node, the latency of the packet being computed based on a round trip time for the request message and the corresponding reply message.

6. The media of claim 4, wherein the instructions to compute the latency further comprise instructions to:
   compare the computed latency to a low latency threshold and to a high latency threshold; and
   determine if a good quality condition exists for the given outgoing network connection based on the comparison of the computed latency to the low latency threshold and to determine if a poor quality condition exists for the given outgoing network connection based on the comparison of the computed latency to the high latency threshold, the bandwidth control command being provided to one of increase, decrease or not adjust the rate limit based on the determined quality condition.

7. The media of claim 6, comprising further instructions to determine the demand for additional bandwidth based on detecting a number dropped packets from the outgoing traffic sent from the one network node via the given outgoing network connection, the bandwidth controller providing the bandwidth control command to increase the rate limit if the determined quality condition is good and based on detecting at least the number of dropped packets.

8. The media of claim 6, comprising further instructions to determine if the throughput of the given outgoing network connection exceeds a throughput threshold, the bandwidth control command being provided to decrease the rate limit if the determined quality condition is poor and based on detecting the throughput is above the throughput threshold.

9. The media of claim 6, wherein in response to detecting a first instance of high latency condition over N measurement intervals, N being a positive integer, the bandwidth control command being provided to reduce the rate limit and a tentative upper bound being set for the rate limit,
   wherein, in response to detecting a second instance of high latency condition being detected during a subsequent consecutive measurement interval before detecting a low latency condition, the tentative upper bound is confirmed and set as the upper bound for the rate limit.

10. The media of claim 4, wherein the instructions to compute the latency further comprise instructions to:
   compute at least N latency measurements, corresponding to the quality measurement, over N consecutive measurement intervals, where N is a positive integer;
   compare each computed latency measurement to a corresponding one of N thresholds; and
   provide the determined quality condition based on at least one of the N latency comparisons satisfying its corresponding threshold.

11. The media of claim 10, wherein the instructions to compare each computed latency measurement further comprise instructions to
   compare each of the N computed latency measurements to a corresponding low latency threshold,
   compare each of P computed latency measurements to a corresponding high latency threshold, where P is a positive integer,
   wherein the determined quality condition is provided based on either of the low latency or the high latency thresholds being satisfied.

12. The media of claim 1, further comprising instructions to set an upper bound to be greater than or equal to the rate limit and a lower bound to be less than or equal to the rate limit, the upper bound and the lower bound being employed to adjust the bandwidth control command.

13. The media of claim 12, further comprising instructions to adjust the lower bound by one of (i) decreasing the lower bound based on the rate limit and in response to setting the rate limit to a value that is below the lower bound or (ii) increasing the lower bound based on a measured throughput for the given outgoing network connection and in response to determining that the quality measurement indicates a good quality for at least one measurement interval.

14. The media of claim 13, further comprising instructions to adjust the upper bound by one of (i) decreasing the upper bound in response to detecting high latency at the rate limit or (ii) increasing the upper bound up to the rate limit in response to setting the rate limit above the upper bound.

15. The media of claim 1, wherein the instructions further comprise a instructions to determine demand for bandwidth based on detecting a number of packets dropped by a network interface that supplies outgoing data traffic to the given outgoing network connection.

16. The media of claim 1, wherein the instructions further comprise a instructions to compute a current value representing throughput of the outgoing traffic from the one network node via the given outgoing network connection.

17. The media of claim 1, wherein the given outgoing network connection comprises at least one respective tunnel between network interfaces at each of the one network node and the other network node to encapsulate communication of the data traffic between the one network node and the other network node.

18. The media of claim 1, wherein the instructions are executed by one or more processors residing at the one network node;
   wherein the media further comprises other instructions executed by one or more other processors residing at the other network node, the other instructions configured to:
      provide a quality measurement associated with another outgoing network connection from the other network node to the one network node;
      provide a respective bandwidth control command that is dynamically adjusted over time based on the quality measurement associated with the other outgoing network connection and at least one of throughput or demand for bandwidth of the other outgoing network connection; and
      adjust a rate limit for the other outgoing network connection based on the respective bandwidth control command.

19. The media of claim 18, wherein the instructions at the one network node and the instructions at the other network node operate to adjust their respective bandwidth control commands at different rates.

20. An apparatus comprising:
   a network interface associated with a node (node A) to communicate bi-directional data traffic via a network connection between the apparatus another network interface associated with another node (node B);
   one or more non-transitory media to store data, the data including machine readable instructions;
   one or more processors to access the one or more media and execute the instructions, the instructions configured to:
      compute a quality measurement for a network connection between node A and node B from measurement data acquired over time;
      accumulate statistical information to characterize the quality measurements associated with the network connection over a plurality of measurement intervals;
      compare each of N computed quality measurements to a threshold derived from N and the accumulated statistical information, where N is a positive integer; and
      determine a quality condition associated with a given outgoing network connection from node A to node B based on the comparison;
      generate a bandwidth control command that is dynamically adjusted over time based on the quality condition and at least one of throughput or demand for bandwidth of the given outgoing network connection; and
      adjust a rate limit of the network interface for the given outgoing network connection based on the bandwidth control command.

21. The apparatus of claim 20 in combination with another apparatus to provide system, the system comprising:
   the apparatus of claim 20; and
   the another apparatus comprising:
      the other network interface associated with node B to communicate bi-directional data traffic with node A via the network connection;
      one or more non-transitory media to store data, the data including machine readable instructions;
      one or more other processors to access the one or more media and execute the instructions configured to:
         determine a quality condition associated with another given outgoing network connection from node B to node A based on quality measurements associated with the other given outgoing network connection;
         generate a respective bandwidth control command that is dynamically adjusted over time based on the quality condition and at least one of throughput or demand for bandwidth of the other given outgoing network connection from node B; and adjust a rate limit of the network interface associated with node B for the other given outgoing network connection based on the respective bandwidth control command.

22. The system of claim 21, wherein the bandwidth control command at node A and the bandwidth control command at node B are generated to operate at different rates.

23. The media of claim 20, wherein the quality measurement comprises a latency value for a packet communicated over the network connection for each of the plurality of measurement intervals, wherein instructions to determine the quality condition are further configured to:

compare each latency value computed over N consecutive of the measurement intervals to one or more low latency thresholds and to one or more high latency thresholds; and determine if a good quality condition exists for the given outgoing network connection based on the comparison of each computed latency value to the one or more low latency thresholds; and determine if a poor quality condition exists for the given outgoing network connection based on the comparison of each computed latency value to the one or more high latency thresholds, the bandwidth control command being generated to one of increase, decrease or not adjust the rate limit based on the determined quality condition.

24. The apparatus of claim 23, wherein instructions to generate the bandwidth control command are further configured to:

determine the demand for additional bandwidth based on detecting a number dropped packets from the outgoing traffic that is sent from node A via the given outgoing network connection, the bandwidth control command being generated to increase the rate limit if the determined quality condition is good and based on detecting at least the number of dropped packets; and determine if the throughput of the given outgoing network connection exceeds a throughput threshold, the bandwidth control command being generated to decrease the rate limit if the determined quality condition is poor and based on detecting the throughput is above the throughput threshold.

25. The apparatus of claim 23, wherein instructions to determine the quality condition are further configured to:

in response to detecting a first instance of high latency condition over N measurement intervals, N being a positive integer, set a tentative upper bound for the rate limit and providing the bandwidth control command to reduce the rate limit, wherein, in response to detecting another instance of high latency condition being detected during a subsequent consecutive measurement interval before detecting a low latency condition, the tentative upper bound is confirmed and set as the upper bound for the rate limit.

26. The apparatus of claim 20, wherein instructions to adjust the rate limit are further configured to:

set an upper bound to be greater than or equal to the rate limit and a lower bound to be less than or equal to the rate limit;

adjust the lower bound by one of (i) decreasing the lower bound based on the rate limit and in response to setting the rate limit to a value that is below the lower bound or (ii) increasing the lower bound based on a measured throughput for the given outgoing network connection and in response to determining that the quality measurement indicates a good quality for at least one measurement interval; and adjust the upper bound by one of (i) decreasing the upper bound in response to detecting high latency at the rate limit or (ii) increasing the upper bound up to the rate limit in response to setting the rate limit above the upper bound, wherein the bandwidth control command is generated based on the upper bound and the lower bound.

27. The apparatus of claim 20, wherein the given outgoing network connection comprises at least one respective tunnel between the network interfaces at node A and node B to encapsulate communication of the data traffic between node A and node B.

28. The apparatus of claim 20, wherein the instructions further comprise instructions for assigning or reassigning a session of the data traffic provided from node A to node B via the given outgoing network connection to one of a plurality of available network connections based on the quality measurement.

29. A method comprising:

computing a quality measurement from measurement data acquired over measurement intervals associated with a network connection between one network node and another network node;

accumulating statistical information to characterize the quality measurements over a plurality of the measurement intervals;

evaluating the quality measurements over N measurement intervals by comparing each computed quality measurement to a threshold that is based on N and the accumulated statistical information;

determining a quality condition based on the evaluation;

providing a bandwidth control command that is dynamically adjusted over time based on the quality condition and at least one of throughput or demand for bandwidth of the given outgoing network connection; and adjusting a rate limit for the given outgoing network connection based on the bandwidth control command.

* * * * *